United States Patent [19]

Eng et al.

[11] Patent Number: 5,428,609
[45] Date of Patent: Jun. 27, 1995

[54] STM-TO-ATM CONVERTERS

[75] Inventors: Kai Y. Eng, Middletown, N.J.; Gary D. Martin, North Andover, Mass.; Mark A. Pashan, Wheaton, Ill.; Vikram Punj, Naperville, Ill.; Ronald A. Spanke, Wheaton, Ill.

[73] Assignee: AT&T Corp., Murray Hill, N.J.

[21] Appl. No.: 176,053

[22] Filed: Jan. 3, 1994

[51] Int. Cl.⁶ .................. H04J 3/26; H04L 12/56
[52] U.S. Cl. ..................... 370/60.1; 370/94.2; 370/99
[58] Field of Search ............ 370/60, 60.1, 79, 82, 370/84, 94.1, 94.2, 99, 100.1, 105.1

[56] References Cited

U.S. PATENT DOCUMENTS

| | | | |
|---|---|---|---|
| 5,144,619 | 9/1992 | Munter | 370/60.1 |
| 5,159,591 | 10/1992 | Gohara et al. | 370/60 |
| 5,206,858 | 4/1993 | Nakano et al. | 370/94.1 |
| 5,214,639 | 5/1993 | Herion | 370/60 |
| 5,271,004 | 12/1993 | Proctor et al. | 370/60 |
| 5,278,828 | 1/1994 | Chao | 370/60 X |
| 5,301,189 | 4/1994 | Schmidt et al. | 370/60.1 |
| 5,341,376 | 8/1984 | Yamashita | 370/99 |

Primary Examiner—Melvin Marcelo

[57] ABSTRACT

A data stream is converted from a synchronous transfer mode (STM) to an asynchronous transfer mode (ATM) by extracting data of a number of payload signals from the data stream, writing data of the payload signal into a random access memory (RAM), separately recording address locations of the data of each of the payload signals in separate buffers, directing the RAM to separately read the data of the payload signals, and attaching a cell header to the data read from the RAM to form ATM cells.

8 Claims, 2 Drawing Sheets

STM-TO-ATM CONVERTERS

FIELD OF THE INVENTION

This invention relates to conversion of the transmission of data streams between transport in the synchronous transfer mode (STM) and transport in the asynchronous transfer mode (ATM), and particularly to improved STM to ATM converters (SACs).

BACKGROUND OF THE INVENTION

In traditional digital network transmissions, data bits are transported in fixed-bandwidth channels multiplexed into high-speed lines (e.g., fibers) in a Time-Division-Multiplex (TDM) manner, and the digital transmission hierarchy is organized into formats such DS-1 (1.5 Mb/s), DS-3 (45 Mb/s), or SONET (Synchronous Optical Network) formats, e.g., STS-x where x can range from 1 to 48 (50 Mb/s to 2.4 Gb/s). The SONET operation is also commonly known as the Synchronous Transfer Mode (STM), and thus the international standards (CCITT) version of the SONET as SDH (Synchronous Digital Hierarchy) where the signals are designated as STM-1 (150 Mb/s), STM-4 (622 Mb/s) and STM-16 (2.4 Gb/s).

Contrary to this concept of synchronous transmission of fixed-bandwidth channels, ATM (Asynchronous Transfer Mode) employs the notion of fixed-size cells (53-octet cells, octet=8-bit byte) to transmit arbitrary-bandwidth signals, and virtual channels can be set up between end points for variable rate transmissions. A key element to interchange between STM and ATM is the STM-to-ATM Converter (SAC).

The main function of an SAC is to take a fixed-bandwidth signal (e.g., DS-1, 1.5 Mb/s) and convert it into ATM cells for ATM transport. This process is called ATM adaptation (AAL in the standards). The main conversion process involves segmentation of the data into 48-octet payloads and the addition of a 5-octet header to each 48-octet piece to form 53-octet cells. It is customary to design a SAC for a fixed-bandwidth signal such as DS-1, DS-3, or STM-1. However, the payload of the STM-16 signal may be of different possibilities, e.g., four STM-4 (622 Mb/s), or 48 DS-3 signals, and so on. Constructing a specific SAC for each combination is cumbersome and expensive.

An object of the invention is to overcome the disadvantages of prior methods and systems.

Another object is to furnish a flexible device arrangement which can cope with a large variety of signal compositions and can perform ATM conversions on these different signal combinations.

SUMMARY OF THE INVENTION

According to a feature of the invention, converting a data stream from a synchronous transfer mode (STM) to an asynchronous transfer mode (ATM) involves extracting a plurality of payload signals from the data stream, writing data of the payload signals into a random access memory (RAM), separately recording address locations of each of the data of each of the payload signals, directing the RAM to separately read the data of the payload signals, and attaching a cell header to the data read from the RAM to form ATM cells.

These and other features of the invention are pointed out in the claims. Other objects and advantages of the invention will become evident from the following description when read in light of the accompanying drawings.

DETAILED DESCRIPTION OF PREFERRED EMBODIMENTS

Figure 1:
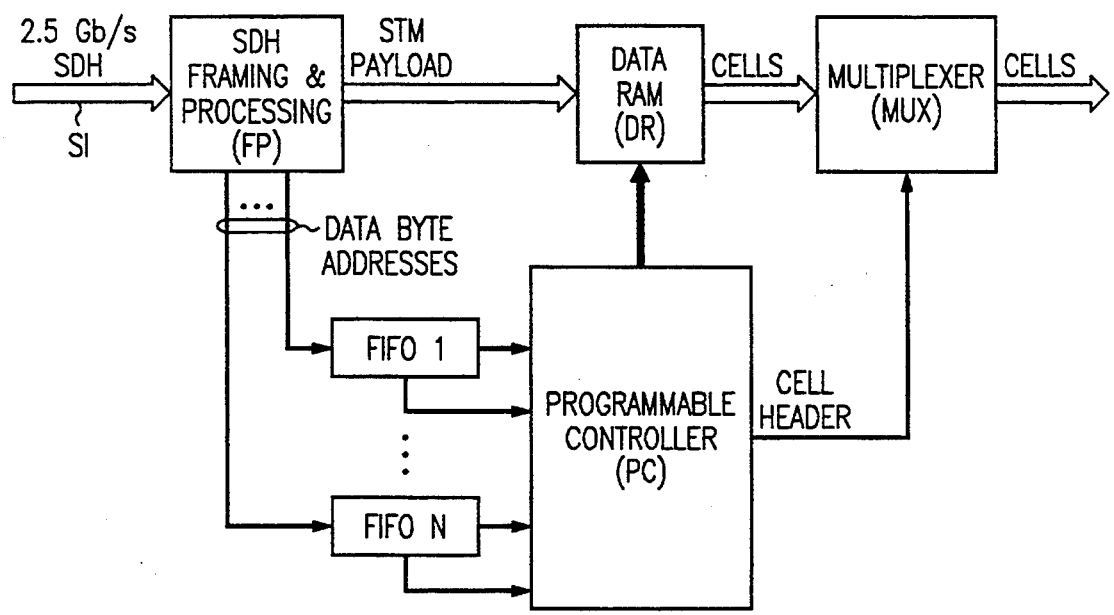
FIG. 1 is a block diagram of an SAC embodying feature of the invention.

The converter of FIG. 1 is an example of an SAC which converts the payload of an incoming 2.5 Gb/s STM-16c signal into ATM cells. Specifically, the incoming SDH signal SI passes to a synchronous data hierarchy SDH framing and processing block FP for removal of the signal overhead and extraction of the payload. The STM payload now passes to a data RAM DR which writes the payload bytes into the RAM. Simultaneously operating and separate first-in-first-out (FIFO) buffers FIFO1 ... FIFOn record the address locations, within the RAM DR with respect to different payload signals. The example of FIG. 1 shows 48 FIFO buffers for a maximum of 48 DS-3 signals. That is, as shown, the system is programmed for extracting up to 48 separate payload signals and acts on them individually for ATM conversion. A programmable controller PC receives the addresses from the FIFO buffers FIFO1 to FIFOn and directs the RAM DR to read out the data bytes of a single specific payload signal. The controller PC attaches a cell header to specific data cells to form an AMT cell. The cells from the data RAM pass to a multiplexer MUX along with the cell header.

According to one embodiment of the invention, the cell header is the standard ATM cell header. According to another embodiment, the cell header is an internal cell header of an ATM switch or cross connect. The latter is an expanded version of the standard cell. The multiplexer MUX passes ATM signals out of the system.

The invention furnishes a PSAC (Programmable SAC) for the incoming signal and has its payload signals converted into ATM cells. The 2.5 Gb/s (STM-16c) signal is only an example. The embodiment provides a flexible device which can cope with a large variety of signal compositions and can be "reprogrammed" to perform ATM conversions on different signal combinations.

FIG. 1 shows a programmable SAC (PSAC) for conversion of STM payload into cells. It contemplates a delay for DS3 of less than 50 microseconds. As shown in FIG. 1, the incoming signal SI is first processed for its overhead removal in the SDH framing and processing block FP so that its payload can be extracted. The payload bytes are written onto a DATA RAM. Meanwhile, the address locations of these data bytes are recorded into separate FIFO (first-in first-out) buffers designated for different payload signals. As an example, 48 separate FIFO's for a maximum of 48 DS-3 signals have been shown. That is, in this example, the PSAC was programmed for extracting up to 48 separate payload signals and for acting on them individually for ATM conversion. The programmable controller PC directs the DATA RAM to read out the data bytes (48 bytes) from a single specific payload signal and attach a cell header to form an ATM cell. Depending on the application, the cell header could be the standard ATM cell header, or could be an internal cell header of an ATM switch or cross-connect (i.e., an internal cell is usually an expanded version of the standard cell).

Figure 2:
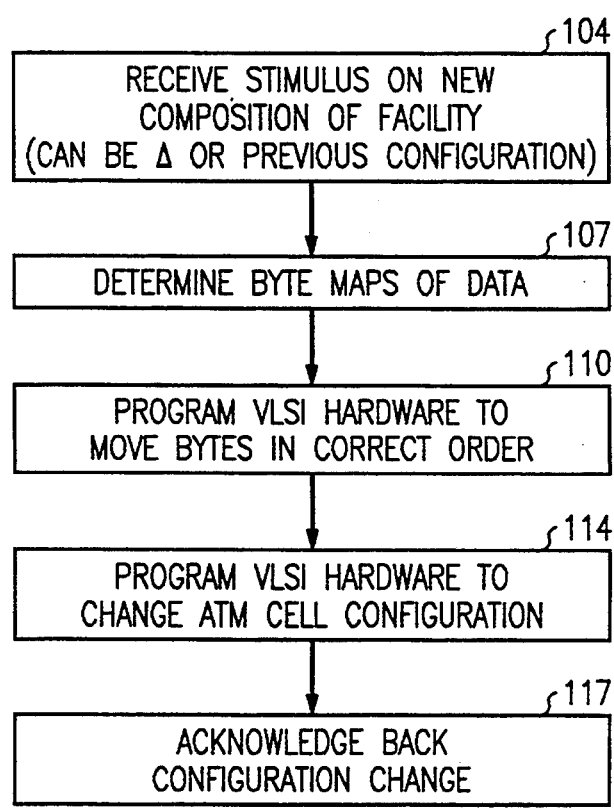
FIG. 2 is a flow chart of the operation in FIG. 1.

FIG. 2 is a flow chart which illustrates the operation in FIG. 1. Here, step 104 involves receiving stimulus of new composition of facility. This can be a Δ or the previous configuration. Step 107 involves determining the byte maps of the data. Step 110 involves programming VLSI hardware for the desired result, or using VLSI hardware which has been programmed for the desired result, to move the bytes in the correct order. Step 114 entails programming the VLSI hardware, or using the preprogrammed VLSI hardware, to change ATM cell configuration to the desired configuration. Step 117 involves acknowledging back the configuration change. The controller changes the configuration on a node by node basis.

In one embodiment, the system converts VTs in the payload of a high-speed STM signal into cells of "internal" format for the purpose of using the ATM fabric as a multi-rate crossconnect. It uses flexible rates 1.5 Mb/s-2.5 Gb/s and pointer processing.

According to another embodiment of the invention, the incoming signal is first demultiplexed. The present invention allows the incoming signal S1 to be composed of an arbitrary number of payload signals. Thus according to an embodiment of the invention the incoming signal S1 is composed of an arbitrary number of payload signals.

It will be recognized that the invention is not limited to the specific structures, steps, and rates shown, but may use others. While specific embodiments have been disclosed, it will be evident to those skilled in the art that the invention may be embodied otherwise without departing from its spirit and scope.

What is claimed is:

1. The method of processing a data stream in a synchronous transfer mode (STM) comprising:

extracting a plurality of payload signals having data from the data stream;

writing data of the payload signals into a random access memory (RAM);

separately recording address locations of the data of each of the plurality of payload signals;

directing the RAM to separately read the data of each single one of the payload signals; and attaching a cell header to the data read from the controller to form ATM cells.

2. A method as in claim 1, wherein the extracting step includes removing overhead in the synchronous digital hierarchy framing.

3. A method as in claim 1, wherein the recording step includes recording in a separate buffer for each of said payload signals.

4. A method as in claim 1, wherein the recording step includes recording in a separate first-in-first-out buffer for each of the payload signals.

5. A system for processing a data stream in a synchronous transfer mode (STM) comprising:

means for extracting a plurality of payload signals from the data stream;

a random access memory (RAM);

means for writing data of the payload signals into said random access memory (RAM);

buffer means for recording RAM locations of the data of the payload signal;

programmable controller means for directing said RAM to read the data of each single one of the payload signals; and said programmable controller means including means for attaching a cell header to the data read to form an ATM cell.

6. A system as in claim 5, wherein the data stream includes synchronous digital hierarchy framing and said extracting means includes means for removing overhead in the synchronous data hierarchy framing.

7. A system as in claim 5, wherein the recording means includes a separate buffer for each of the payload signals.

8. A system as in claim 5, wherein the recording means includes a separate first-in-first-out buffer for the payload signal.

* * * * *